United States Patent
Fujii et al.

(10) Patent No.: US 10,401,959 B1
(45) Date of Patent: Sep. 3, 2019

(54) INFORMATION PROCESSING DEVICE, METHOD FOR CONTROLLING DISPLAY, AND PROGRAM

(71) Applicant: LENOVO (SINGAPORE) PTE. LTD., Singapore (SG)

(72) Inventors: Kazuo Fujii, Yokohama (JP); Arimasa Naitoh, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/012,134

(22) Filed: Jun. 19, 2018

(30) Foreign Application Priority Data

Apr. 2, 2018 (JP) .................................. 2018-070926

(51) Int. Cl.
*G06F 3/01* (2006.01)
*G06F 3/0481* (2013.01)
*G06F 1/16* (2006.01)

(52) U.S. Cl.
CPC ............ *G06F 3/013* (2013.01); *G06F 1/1686* (2013.01); *G06F 3/04812* (2013.01)

(58) Field of Classification Search
CPC ..... G06F 3/013; G06F 3/04812; G06F 1/1686
See application file for complete search history.

(56) References Cited

U.S. PATENT DOCUMENTS

| 2013/0212522 | A1* | 8/2013 | Fleizach | ............... | G06F 3/0488 |
| | | | | | 715/784 |
| 2016/0203581 | A1* | 7/2016 | Keller | ..................... | G06F 3/013 |
| | | | | | 345/676 |
| 2018/0017996 | A1* | 1/2018 | Ryu | ....................... | G06F 1/1675 |

FOREIGN PATENT DOCUMENTS

JP        2017208638 A        11/2017

* cited by examiner

*Primary Examiner* — Andrew Sasinowski
(74) *Attorney, Agent, or Firm* — Shimokaji IP

(57) ABSTRACT

To improve the convenience at a display unit having a notch, an information processing device includes: a display unit having a recess-like notch as a non-displaying part; and a display control unit configured to, in response to a trigger from a user, display a display target hidden by the notch on the display unit so as to avoid the notch.

10 Claims, 8 Drawing Sheets

INFORMATION PROCESSING DEVICE, METHOD FOR CONTROLLING DISPLAY, AND PROGRAM

FIELD OF THE INVENTION

The present invention relates to an information processing device, a method for controlling display, and a program.

BACKGROUND OF THE INVENTION

Recently an information processing device including a display unit as well as an imaging unit, such as a camera, has been known (see Japanese Patent Application Laid-Open No. 2017-208638, for example). Such an information processing device includes an imaging unit at the top of the frame above the display unit.

SUMMARY OF THE INVENTION

Such an information processing device tends to have a narrower frame of the display unit. The display unit of the information processing device therefore may have a cut part (notch) like a recess to displace the imaging unit. Such an information processing device including a display unit with a notch may have difficulty in operation if the notch hides an operating target from the display.

In order to solve the above problem, the present invention aims to provide an information processing device, a method for controlling display, and a program for better convenience of the display unit with a notch.

To solve the above-stated problem, an information processing device according to the first aspect of the present invention includes: a display unit having a recess-like notch as a non-displaying part; and a display control unit configured to, in response to a trigger from a user, display a display target hidden by the notch on the display unit so as to avoid the notch.

In the information display device according to the first aspect of the present invention, the display control unit may change an aspect ratio of display screen data at least partially to be displayed on the display unit to display the display target hidden by the notch.

In the information display device according to the first aspect of the present invention, when the hidden display target is displayed, the display control unit may replace a display position of the hidden display target with a part of the display unit for displaying.

In the information display device according to the first aspect of the present invention, when the hidden display target is displayed, the display control unit may move a display position of a display screen to be displayed on the display unit so as to avoid the notch.

In the information display device according to the first aspect of the present invention, the trigger may be designation with a pointing device of a predetermined range including the notch.

In the information display device according to the first aspect of the present invention, the trigger may be reception of a predetermined key input operation with a key input unit.

In the information display device according to the first aspect of the present invention, the trigger may be reception of detection of gaze of the user in a predetermined range including the notch with an eye-gaze tracking unit to detect gaze of the user.

A method for controlling display according to the second aspect of the present invention is to control display of an information processing device including a display unit having a recess-like notch as a non-displaying part, and the method includes: a trigger reception step of receiving a trigger from a user; and a display control step of, in response to the trigger from the user at the trigger reception step, displaying a display target hidden by the notch on the display unit so as to avoid the notch.

The above described aspects of present invention can improve the convenience at the display unit with a notch.

DETAILED DESCRIPTION OF THE INVENTION

Figure 1:
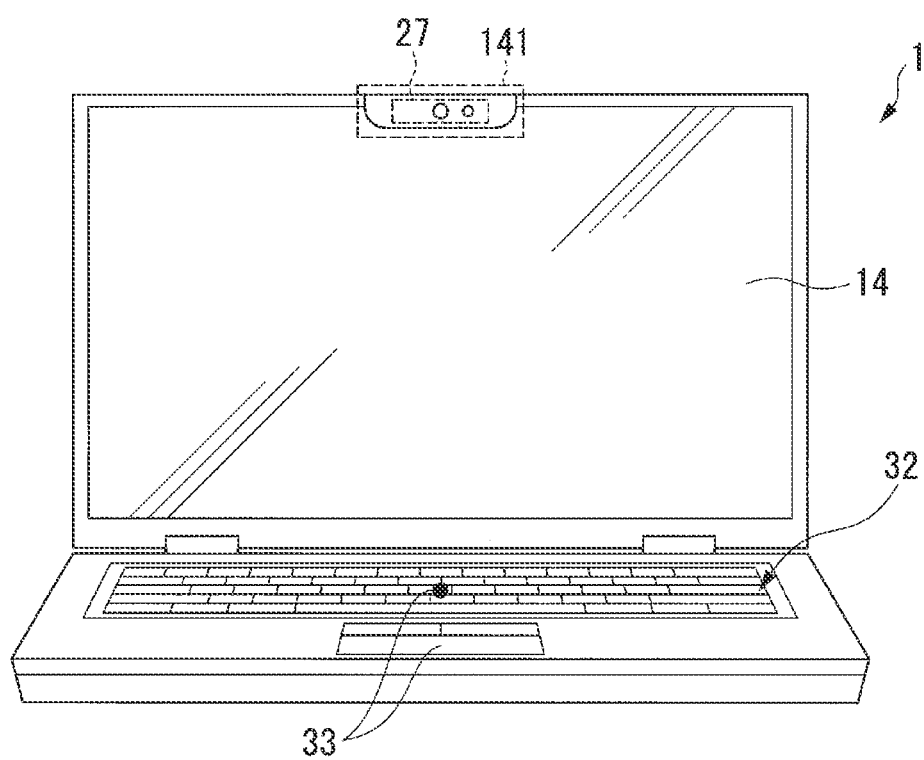
FIG. 1 shows the appearance of one example of a laptop PC according to a first embodiment.

Referring to the drawings, the following describes an information processing device and a method for controlling display according to one embodiment of the present invention.

First Embodiment

Figure 2:
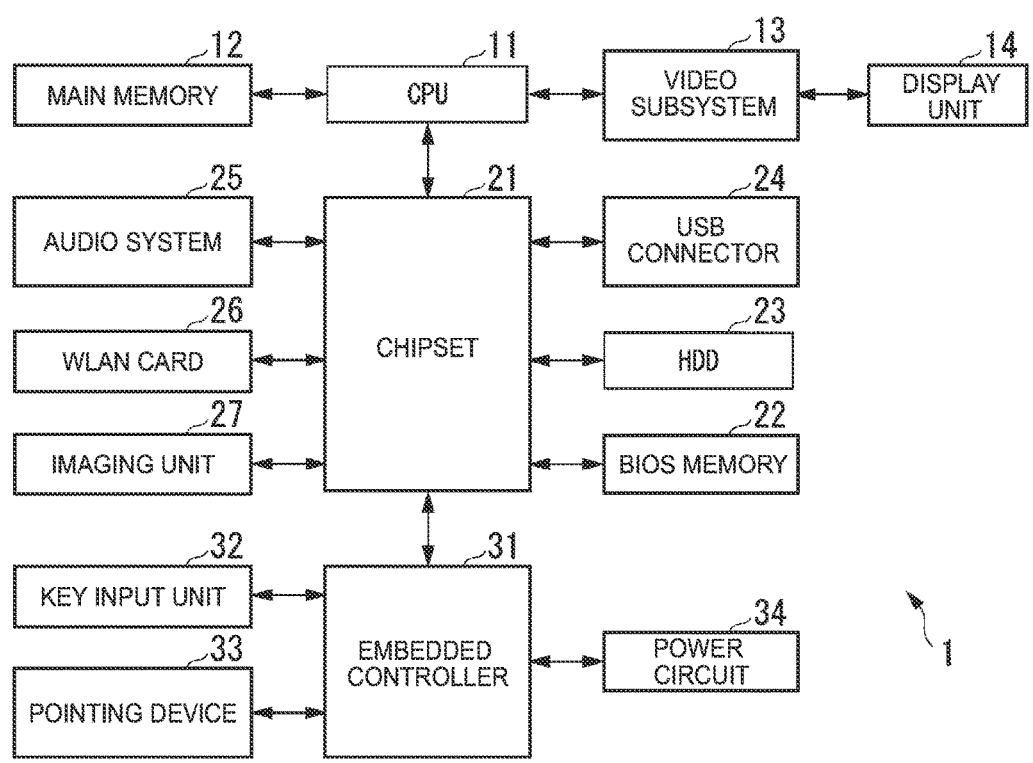
FIG. 2 shows one example of a major hardware configuration of the laptop PC according to the first embodiment.

FIG. 1 shows the appearance of one example of a laptop PC 1 according to the first embodiment. FIG. 2 shows one example of a major hardware configuration of the laptop PC 1 according to the first embodiment. The following describes the present embodiment by way of the laptop PC (personal computer) 1 as one example of the information processing device.

As shown in FIG. 1, the laptop PC 1 is a laptop-type personal computer, and includes a display unit 14 having a recess-like notch 141 as a not-displaying part. At the notch 141, an imaging unit 27 is disposed.

As shown in FIG. 2, the laptop PC 1 includes: a CPU 11; a main memory 12; a video subsystem 13; a display unit 14; a chipset 21: a BIOS memory 22; a HDD 23: a USB connector 24; an audio system 25; a WLAN card 26; the imaging unit 27; an embedded controller 31; a key input unit 32; a pointing device 33; and a power circuit 34.

The CPU (Central Processing Unit) 11 executes various types of arithmetic processing in accordance with programs to control the laptop PC 1 as a whole.

The main memory 12 is a writable memory functioning as a read-in area of a program executed by the CPU 11 or a work area to write data processed by the executed program. The main memory 12 includes a plurality of DRAM (Dynamic Random Access Memory) chips, for example. The program executed includes an OS (Operating System), various types of drivers to operate peripherals as hardware, various types of service/utility, and application programs.

The video subsystem 13 is to implement the functions related to image displaying, and includes a video controller. This video controller processes a drawing instruction from the CPU 11 and writes the processed drawing information on a video memory. The video controller also reads this drawing information from the video memory and outputs the drawing information as drawing data (display data) to the display unit 14.

The display unit 14 is a liquid crystal display or an organic EL (Electro-Luminescence) display, and displays a display screen based on the drawing data (display data) output from the video subsystem 13. As shown in FIG. 1, the display unit 14 is a display having a narrow frame, and has the notch 141 at which the imaging unit 27 described later is disposed. The notch is a not-displaying part that does not display anything.

The chipset 21 includes a controller, such as USB (Universal Serial Bus), serial ATA (AT Attachment), SPI (Serial Peripheral Interface) bus, PCI (Peripheral Component Interconnect) bus, PCI-Express bus, or LPC (Low Pin Count) bus, and a plurality of devices are connected to the chipset. FIG. 2 shows examples of the devices connected to the chipset 21, including the BIOS memory 22, the HDD 23; the USB connector 24, the audio system 25, the WLAN card 26, the imaging unit 27, and the embedded controller 31.

The BIOS (Basic Input Output System) memory 22 includes a non-volatile memory that is electrically rewritable, such as an EEPROM (Electrically Erasable Programmable Read Only Memory) or a flash ROM. The BIOS memory 22 stores BIOS and system firmware to control the embedded controller 31 or the like.

The WLAN (Wireless Local Area Network) card 26 connects to a network via wireless LAN for data communication. When receiving data from the network, for example, the WLAN card 26 generates an event trigger indicating the data reception.

The imaging unit 27 includes a camera for visible light and an infrared camera for facial recognition and eye-gaze tracking. The imaging unit 27 is disposed at the notch 141 of the display unit 14.

The embedded controller 31 is a one-chip microcomputer to monitor and control various devices (e.g., peripherals and sensors), irrespective of the system state of the laptop PC 1. The embedded controller 31 has a power-management function to control the power circuit 34. The embedded controller 31 includes a CPU, a ROM, and a RAM not illustrated, and has an A/D input terminal, a D/A output terminal, a timer, and a digital input/output terminal for a plurality of channels. The embedded controller 31 connects with the key input unit 32, the pointing device 33, the power circuit 34 and the like via their input/output terminals, and the embedded controller 31 controls the operation of these components.

The key input unit 32 is an input device, such as a keyboard or a touch panel, to receive a key input from a user. The pointing device 33 is an input device, such as a mouse or a touchpad, mainly to receive designation of a position on the display screen or designation or selection of an operation target (object), such as an operational button.

The power circuit 34 includes a DC/DC converter, a discharge/charge unit, a battery unit, and an AC/DC adaptor, and coverts DC voltage supplied from the AC/DC adaptor or the battery unit to a plurality of levels of voltage required to operate the laptop PC 1. The power circuit 34 supplies electricity to various parts of the laptop PC 1 under the control of the embedded controller 31.

Figure 3:
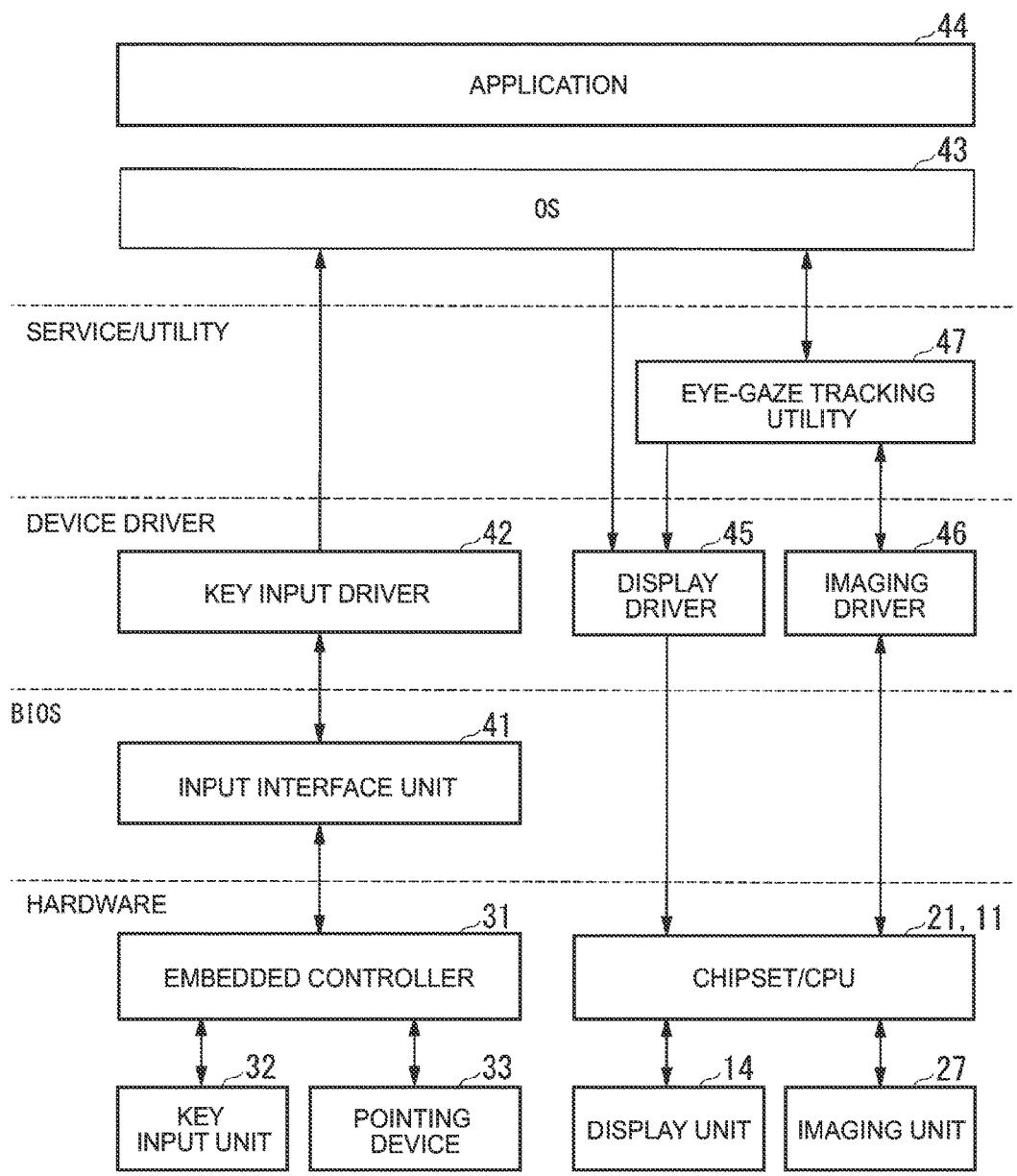
FIG. 3 is a block diagram showing one example of the functional configuration of the laptop PC according to the first embodiment.

Referring next to FIG. 3, the following describes the system of the laptop PC 1 according to the present embodiment.

FIG. 3 is a block diagram showing one example of the functional configuration of the laptop PC 1 according to the present embodiment.

As shown in FIG. 3, the system of the laptop PC 1 includes an input interface unit 41, a key input driver 42, an OS 43, an application 44, a display driver 45, an imaging driver 46, and an eye-gaze tracking utility 47, which are implemented by software. The system of the laptop PC 1 includes, as the major hardware of the present embodiment, the chipset/CPU (21, 11), the display unit 14, the imaging unit 27, the embedded controller 31, the key input unit 32, and the pointing device 33.

In FIG. 3, the application 44, the OS 43, the service/utility, the device driver, and the BIOS are implemented by reading a program stored in the HDD 23 or the BIOS memory 22 into the main memory 12 and executing the program by the CPU 11. Herein the eye-gaze tracking utility 47 corresponds to the service/utility, and the key input driver 42, the display driver 45 and the imaging driver 46 correspond to the device driver. The input interface unit 41 corresponds to the BIOS.

The input interface unit 41 receives the operation by a user of the key input unit 32 and the pointing device 33, and outputs this to the key input driver 42.

The key input driver 42 is a device driver to enable the key input unit 32 and the pointing device 33 to function in the OS 43. When the user operates the key input unit 32 and the pointing device 33, the input interface unit 41 receives such an operation. In response to such a received operation, the key input driver 42 acquires operating information indicating the operation from the input interface unit 41, and outputs the operating information to the OS 43.

The OS 43 is a base software, such as Windows (registered trademark), and provides the operating information acquired from the key input unit 32 or the pointing device 33 via the input interface unit 41 to the application 44 or another device driver.

The application 44 is application software running on the OS 43, which may be word-processing software or spreadsheet software. The application 44 executes various types of processing in accordance with the operating information acquired via the OS 43 and the key input driver 42, for example.

The imaging driver 46 is a device driver to enable the imaging unit 27 to function in the OS 43. The imaging driver 46 controls the imaging unit 27 via the chipset 21, for example.

The eye-gaze tracking utility 47 (one example of an eye-gaze tracking unit) tracks the gaze of the user based on an image of the user taken by the imaging unit 27 using the imaging driver 46. For example, the eye-gaze tracking utility 47 detects the position of the gaze on the display screen displayed by the display unit 14. The gaze tracked by the eye-gaze tracking utility 47 is used by the OS 43, the application 44, and other device drivers.

The display driver 45 (one example of a display control unit) is a device driver to enable the display unit to function in the OS 43. The display driver 45 displays various types of information (display screen) on the display unit 14 in accordance with a request from the OS 43 or the application 44, for example. In response to a trigger received from the user, the display driver 45 switches the display on the display unit 14 as to whether a display target (e.g., operating target) hidden by the notch 141 of the display unit 14 is displayed so as to avoid the notch 141 or not.

Figure 4:
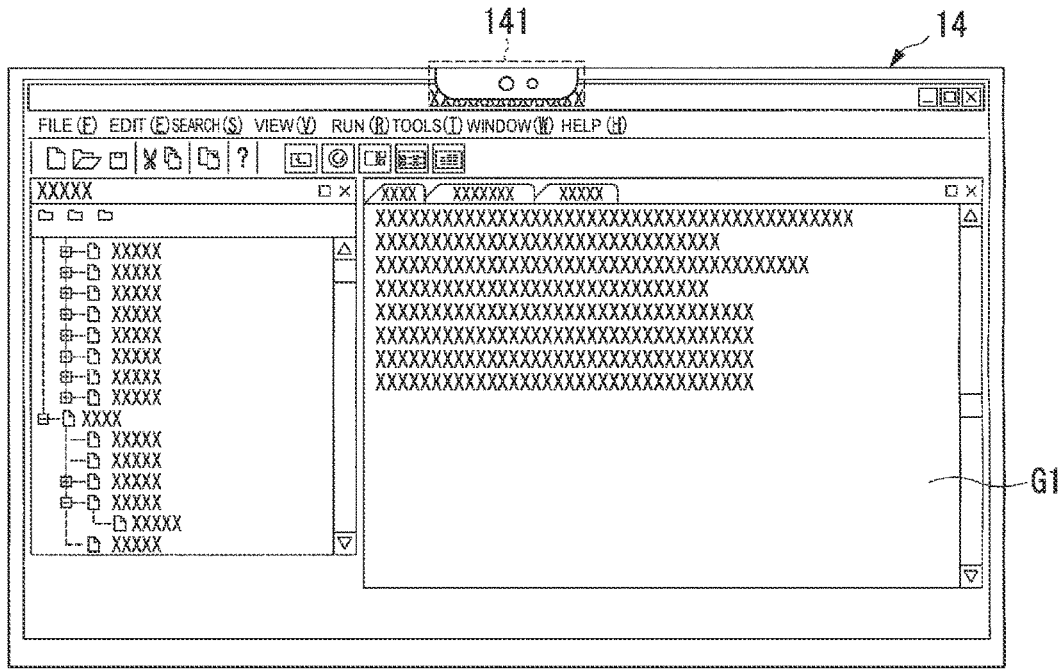
FIG. 4 shows one example of the full-screen display at the display unit according to the first embodiment.

For full screen display on the display unit 14, for example, the display driver 45 displays so that the notch 141 hides the display target as in the screen G1 of FIG. 4. In such a display state, when receiving designation of a predetermined range including the notch 141 with the pointing device 33 as a trigger, for example, the display driver 45 switches the display so that the display target hidden by the notch 141 avoids the notch 141 on the display unit 14, as in the screen G2 of FIG. 5. The predetermined range may be a range within a predetermined distance from the notch 141 or a range of the menu bar area that is hidden by the notch 141, for example.

To display the display target hidden by the notch 141, the display driver 45 changes the aspect ratio (horizontal to vertical ratio or resolution) of the display screen data to be displayed on the display unit 14 so as to avoid the notch 141. Specifically the display driver 45 performs data-conversion processing that changes the ratio of horizontal to vertical of the display screen data so that the notch 141 and a non-display area 142 having the width equal to the notch 141 do not display the display target. The display driver 45 displays the display screen data subjected to the data conversion on the display unit 14 as shown in the screen G2 of FIG. 5.

Referring next to the drawing, the following describes the operation of the laptop PC 1 according to the present embodiment.

Figure 6:
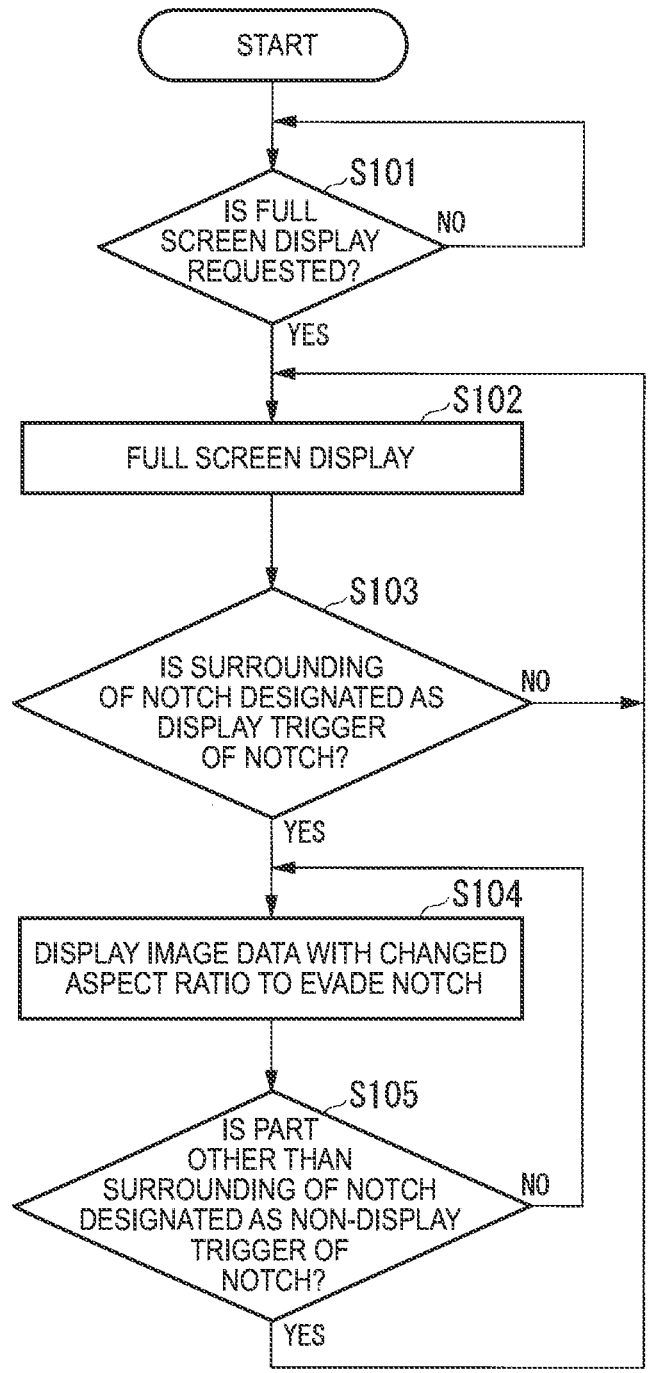
FIG. 6 is a flowchart showing one example of the display control processing in the laptop PC according to the first embodiment.

FIG. 6 is a flowchart showing one example of the display control processing in the laptop PC 1 according to the present embodiment.

As shown in FIG. 6, the display driver 45 of the laptop PC 1 determines whether full screen display is requested or not (Step S101). The display driver 45 determines whether the application 44 or the OS 43 requests full screen display or not. When full screen display is requested (Step S101: YES), the display driver 45 progresses the procedure to Step S102. When full screen display is not requested (Step S101: NO), the display driver 45 returns the procedure to Step S101.

At Step S102, the display driver 45 executes full-screen display on the display unit 14. The display driver executes full-screen display on the full-screen area including the notch 141. Specifically the display driver 45 displays the display screen as in the screen G1 of FIG. 4 on the display unit 14.

Next the display driver 45 determines whether a part around the notch 141 is designated or not as a display trigger of the notch 141 (Step S103). In response to such an event trigger with the pointing device 33, the display driver 45 acquires positional information on the display screen designated with the pointing device 33 via the key input driver 42, and determines whether it designates a part around (within a predetermined range) the notch 141 or not. When it designates a part around the notch 141 (Step S103: YES), the display driver 45 progresses the procedure to Step S104. When it does not designate a part around the notch 141 (Step S103: NO), the display driver 45 returns the procedure to Step S102.

At Step S104, the display driver 45 displays the display screen data with a changed aspect ratio so as to avoid the notch 141. The display driver 45 changes the aspect ratio (horizontal to vertical ratio) of the display screen data for full screen display at an area other than the notch 141 and the non-display area 142, and displays the display screen data with a changed aspect ratio on the display unit 14. That is, the display driver 45 displays the display screen as in the screen G2 of FIG. 5 on the display unit 14.

Next the display driver 45 determines whether a part other than the surrounding of the notch 141 is designated or not as a non-display trigger of the notch 141 (Step S105). In response to such an event trigger with the pointing device 33, the display driver 45 acquires positional information on the display screen designated with the pointing device 33, and determines whether it designates a part other than the surrounding of the notch 141 (other than the predetermined range) or not. When it designates a part other than the surrounding of the notch 141 (Step S105: YES), the display driver 45 returns the procedure to Step S102 to execute full-screen display on the full-screen area including the notch 141.

When it designates a part around the notch 141 (Step S105: NO), the display driver 45 returns the procedure to Step S104.

As described above, the laptop PC 1 (information processing device) according to the present embodiment includes the display unit 14 and the display driver 45 (display control unit). The display unit 14 has the recess-like notch 141 as a non-displaying part. In response to a trigger received from the user, the display driver 45 switches the display as to whether the display target hidden by the notch 141 is displayed on the display unit 14 so as to avoid 141 or not. That is, in response to a trigger received from the user, the display driver 45 displays the display target hidden by the notch 141 on the display unit 14 so as to avoid the notch 141.

In this way, the laptop PC 1 of the present embodiment allows the switching of the display in response to a trigger so that the display target (operation target) hidden by the notch 141 avoid the notch 141. This can avoid the difficulty of operation when the notch 141 hides the operation target from the display. The laptop PC 1 of the present embodiment therefore can improve the convenience at the display unit 14 having the notch 141.

To display the display target hidden by the notch 141, the display driver 45 of the present embodiment changes the aspect ratio of at least a part of the display screen data to be displayed on the display unit 14 so as to avoid the notch 141.

Thereby, the laptop PC 1 of the present embodiment can switch the display so as to avoid the notch 141 by a simple method.

When receiving designation of a predetermined range including the notch 141 with the pointing device 33 as a trigger (display trigger), the display driver 45 switches the display of the display target hidden by the notch 141 on the display unit 14 so as to avoid the notch 141. That is, the trigger is designation with the pointing device 33 of a predetermined range including the notch 141.

Thereby, the laptop PC 1 of the present embodiment can switch the display so as to avoid the notch 141 simply by designating the notch 141 with the pointing device 33, such as a mouse or a touchpad. The laptop PC 1 of the present embodiment therefore can have more improved convenience.

When receiving designation of a part other than the predetermined range including the notch 141 with the pointing device 33 as a trigger (non-display trigger), the display driver 45 switches the display of the display target on the display unit 14 so as to be hidden by the notch 141.

Thereby, the laptop PC 1 of the present embodiment can switch the display to a large screen using the display unit 14 as a whole simply by designating a part other than the notch 141 with the pointing device 33, such as a mouse or a touchpad.

In the present embodiment, the display driver 45 is a device driver, and this device driver implements switching of the display at the notch 141 in accordance with the designation.

Thereby, the laptop PC 1 of the present embodiment can switch the display at the notch 141 in accordance with the designation easily by changing the device driver and not changing the OS 43, such as Windows (registered trademark).

A method for controlling display according to the present embodiment is to control the display of the laptop PC 1 including the display unit 14 having the recess-like notch 141 as a non-displaying part. The method includes a step of receiving a trigger and a step of controlling display. At the step of receiving a trigger, the display driver 45 receives a trigger from a user. At the step of controlling display, the display driver 45 switches the display of the display target hidden by the notch 141 on the display unit 14 so as to avoid the notch 141 or not in accordance with the trigger received from the user at the trigger receiving step.

Thereby, the method for controlling display of the present embodiment has a similar effect to the laptop PC 1 as stated above, and so can improve the convenience at the display unit 14 having the notch 141.

Second Embodiment

Referring next to the drawing, the following describes a laptop PC 1 according to the second embodiment.

The following describes the present embodiment as a modified example, in which a trigger to switch the display on the display unit 14 so as to avoid the notch 141 or not is a predetermined key input operation.

Since the appearance and the configuration of the laptop PC 1 according to the second embodiment is similar to the first embodiment as stated above shown in FIGS. 1 to 3, their descriptions are omitted.

When receiving a predetermined key input operation with the key input unit 32 as a trigger, the display driver 45 of the present embodiment switches the display of the display target hidden by the notch 141 on the display unit 14 so as to avoid the notch 141. Specifically when key operation information obtained from the key input unit 32 via the key input driver 42 shows a predetermined key input operation, the display driver 45 displays the display target hidden by the notch 141 on the display unit 14 so as to avoid the notch 141. Note here that the predetermined key input operation may be pressing of a specific key button, such as a function key, or the combination of pressing of a plurality of key buttons.

Figure 7:
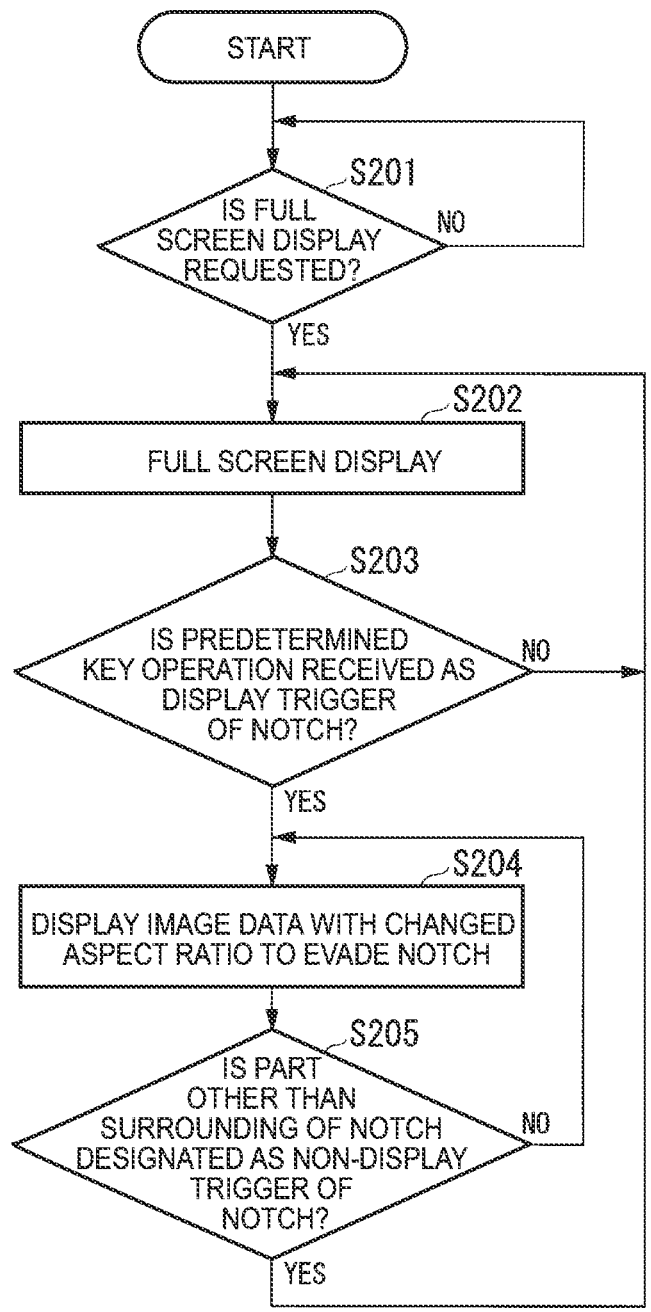
FIG. 7 is a flowchart showing one example of the display control processing in the laptop PC according to the second embodiment.

Referring next to FIG. 7, the following describes the operation of the laptop PC 1 according to the present embodiment.

FIG. 7 is a flowchart showing one example of the display control processing in the laptop PC 1 according to the present embodiment.

In FIG. 7, since the processing at Step S201 and Step S202 is similar to the processing at Step S101 and Step S102 in FIG. 6 as stated above, their description is omitted.

At Step S203, the display driver 45 determines whether a predetermined key input operation is received or not as a display trigger of the notch 141. Specifically in response to the generation of an event trigger with the key input unit 32, the display driver 45 acquires key operation information on the key input unit 32 via the key input driver 42, and determines whether the predetermined key input operation is received or not. When the predetermined key input operation is received (Step S203: YES), the display driver 45 progresses the procedure to Step S204. When the predetermined key input operation is not received (Step S203: NO), the display driver 45 returns the procedure to Step S202.

At Step S204, the display driver 45 displays the display screen data with a changed aspect ratio so as to avoid the notch 141 similarly to the processing at Step S104 in FIG. 6 as stated above.

Next the display driver 45 determines whether a predetermined key input operation is received or not as a non-display trigger of the notch 141 (Step S205). Specifically in response to the generation of an event trigger with the key input unit 32, the display driver 45 acquires key operation information on the key input unit 32 via the key input driver 42, and determines whether the predetermined key input operation is received or not. Note here that the predetermined key input operation in this case may be the same as the key operation for the display trigger as stated above or may be different from such a key operation. When the predetermined key input operation is received (Step S205: YES), the display driver 45 returns the procedure to Step S202 to execute full-screen display on the full-screen area including the notch 141.

When the predetermined key input operation is not received (Step S205: NO), the display driver 45 returns the procedure to Step S204.

As described above, when receiving a predetermined key input operation with the key input unit 32 as a trigger (display trigger), the display driver 45 of the laptop PC 1 of the present embodiment switches the display of the display target hidden by the notch 141 on the display unit 14 so as to avoid the notch 141.

Thereby, the laptop PC 1 of the present embodiment can switch the display so as to avoid the notch 141 simply by a predetermined key input operation with the key input unit 32, such as a keyboard, by the user. The laptop PC 1 of the present embodiment therefore can have more improved convenience.

When receiving a predetermined key input operation with the key input unit 32 as a trigger (non-display trigger), the display driver 45 switches the display of the display target on the display unit 14 so as to be hidden by the notch 141. That is, the trigger is reception of a predetermined key input operation with the key input unit 32.

Thereby, the laptop PC 1 of the present embodiment can switch the display to a large screen using the display unit 14 as a whole simply by a predetermined key input operation by the user, for example.

Third Embodiment

Referring next to the drawing, the following describes a laptop PC 1 according to the third embodiment.

The following describes the present embodiment as a modified example, in which a trigger to switch the display on the display unit 14 so as to avoid the notch 141 or not is designation of a part around the notch 141 with the gaze of the user.

Since the appearance and the configuration of the laptop PC 1 according to the third embodiment is similar to the first embodiment as stated above shown in FIGS. 1 to 3, their descriptions are omitted.

When receiving detection of the gaze of the user in a predetermined range including the notch 141 with the eye-gaze tracking utility 47 as a trigger, the display driver 45 of the present embodiment switches the display of the display target hidden by the notch 141 on the display unit 14 so as to avoid the notch 141. The eye-gaze tracking utility 47 acquires a taken image of the user via the imaging driver 46 and detects the gaze on the screen of the display unit 14 based on the image. When the gaze of the user detected by the eye-gaze tracking utility 47 is within a predetermined range including the notch 141, the display driver 45 displays the display target hidden by the notch 141 on the display unit 14 so as to avoid the notch 141.

Figure 8:
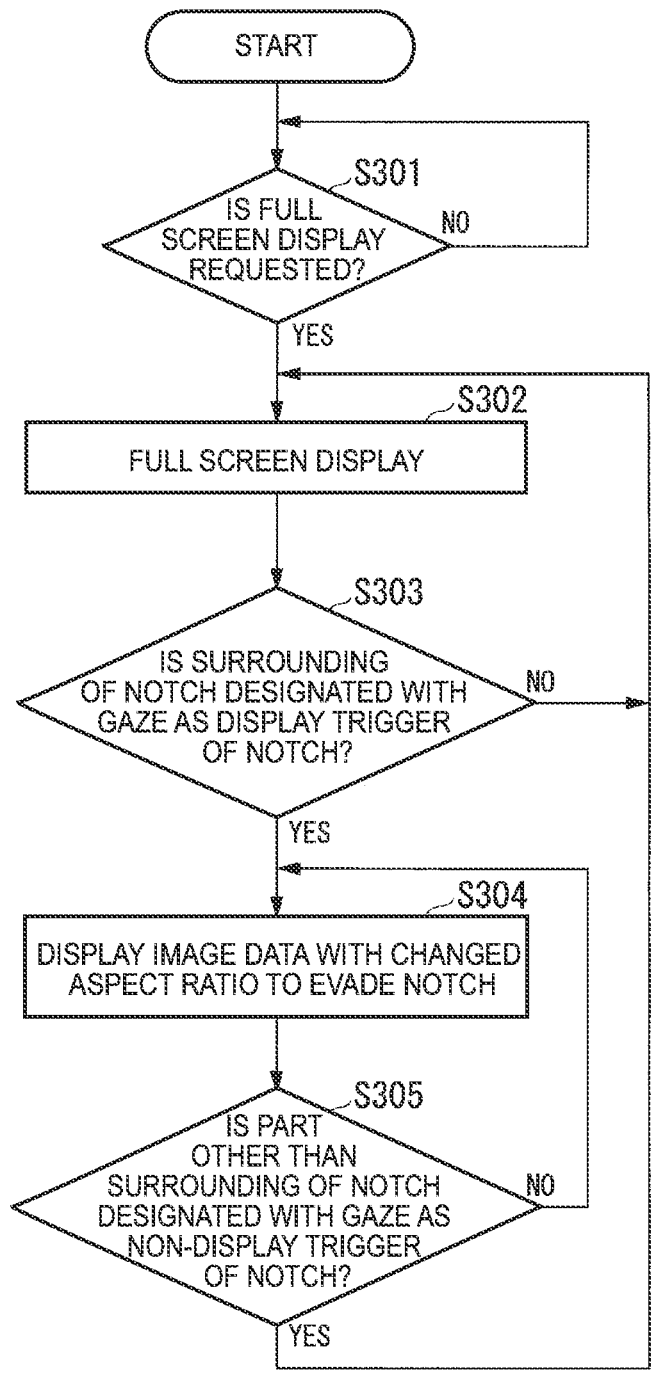
FIG. 8 is a flowchart showing one example of the display control processing in the laptop PC according to the third embodiment.

Referring next to FIG. 8, the following describes the operation of the laptop PC 1 according to the present embodiment.

FIG. 8 is a flowchart showing one example of the display control processing in the laptop PC 1 according to the present embodiment.

In FIG. 8, since the processing at Step S301 and Step S302 is similar to the processing at Step S101 and Step S102 in FIG. 6 as stated above, their description is omitted.

At Step S303, the display driver 45 determines whether a part around the notch 141 is designated or not with the gaze as a display trigger of the notch 141. In response to such an event trigger with the eye-gaze tracking utility 47, the display driver 45 acquires gaze information of the user (gaze on the screen of the display unit 14) from the eye-gaze tracking utility 47, and determines whether the gaze of the user designates a part around the notch 141 (within the predetermined range) or not. When the gaze designates a part around the notch 141 (Step S303: YES), the display driver 45 progresses the procedure to Step S304. When the gaze does not designate a part around the notch 141 (Step S303: NO), the display driver 45 returns the procedure to Step S302.

At Step S304, the display driver 45 displays the display screen data with a changed aspect ratio so as to evade the notch 141 similarly to the processing at Step S104 in FIG. 6 as stated above.

Next the display driver 45 determines whether the gaze designates a part other than the surrounding of the notch 141 or not as a non-display trigger of the notch 141 (Step S305). In response to such an event trigger with the eye-gaze tracking utility 47, the display driver acquires gaze information of the user (gaze on the screen of the display unit 14) from the eye-gaze tracking utility 47, and determines whether the gaze of the user designates a part other than the surrounding of the notch 141 (other than the predetermined range) or not. When the gaze designates a part other than the surrounding of the notch 141 (Step S305: YES), the display driver 45 returns the procedure to Step S302 to execute full-screen display on the full-screen area including the notch 141.

When the gaze designates a part around the notch 141 (Step S305: NO), the display driver 45 returns the procedure to Step S304.

As described above, when receiving, as a trigger (display trigger), detection of the gaze of the user in a predetermined range including the notch 141 with the eye-gaze tracking utility 47 (eye-gaze tracking unit) that detects the gaze of the user, the display driver 45 in the laptop PC 1 of the present embodiment switches the display of the hidden display target on the display unit 14 so as to avoid the notch 141. That is, the trigger is reception of the user's gaze detection in a predetermined range including the notch 141 with the eye-gaze tracking utility 47 that detects the gaze of the user.

Thereby, the laptop PC 1 of the present embodiment can switch the display so as to avoid the notch 141 simply by a user when the user directs the gaze to the surrounding of the notch 141, for example. The laptop PC 1 of the present embodiment therefore can have more improved convenience.

When receiving, as a trigger (non-display trigger), detection of the gaze of the user at a part other than the predetermined range including the notch 141 with the eye-gaze tracking utility 47 (eye-gaze tracking unit), the display driver 45 switches the display of the display target on the display unit 14 so as to be hidden by the notch 141.

Thereby, the laptop PC 1 of the present embodiment can switch the display to a large screen using the display unit 14 as a whole simply by the user when the user shifts the gaze away from the notch 141, for example.

Fourth Embodiment

Referring next to the drawing, the following describes a laptop PC 1 according to the fourth embodiment.

The following describes the present embodiment as a modified example, in which when the display target hidden by the notch 141 is displayed, the position of the display target is changed.

Since the appearance and the configuration of the laptop PC 1 according to the fourth embodiment is similar to the first embodiment as stated above shown in FIGS. 1 to 3, their descriptions are omitted.

When the display target hidden by the notch 141 is displayed, the display driver 45 of the present embodiment changes the display position of the display target so as to avoid the notch 141. For instance, when the display target hidden by the notch 141 is displayed, the display driver 45 moves the display position of the display screen on the display unit 14 so as to avoid the notch 141. Specifically the display driver 45 shifts the display position of the display screen as a whole downward to change the display position of the display target.

Figure 9:
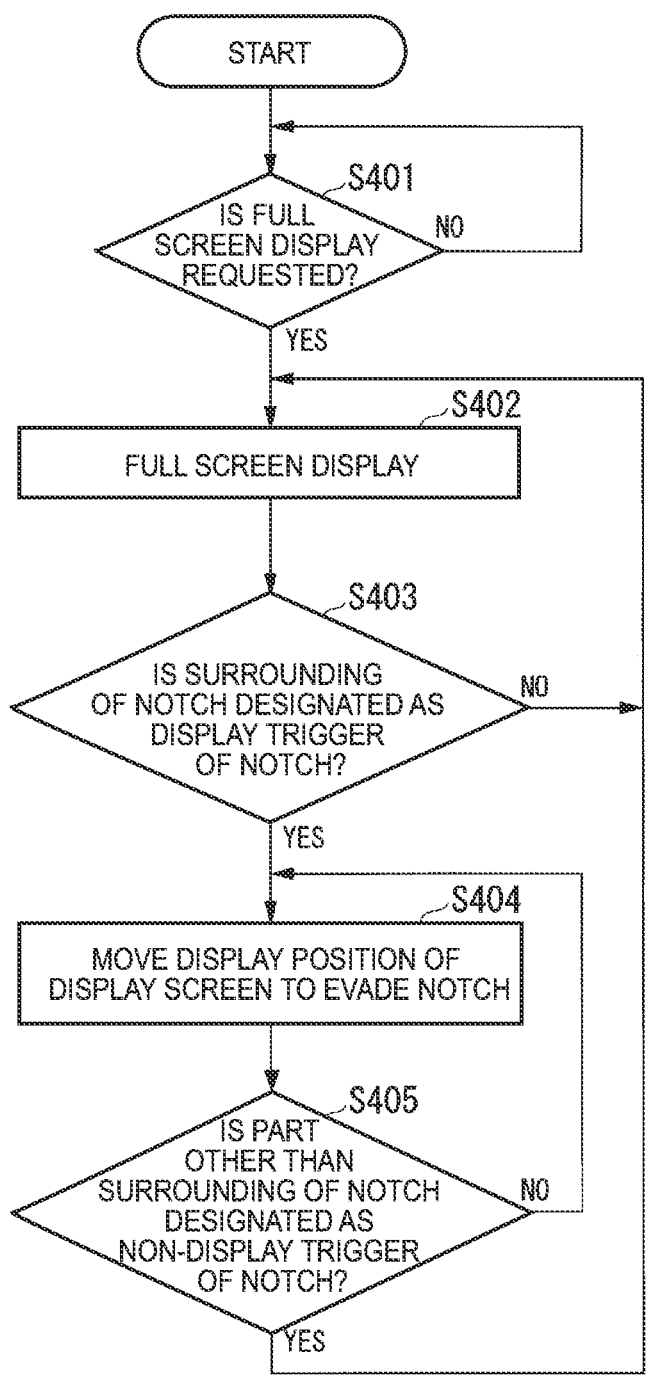
FIG. 9 is a flowchart showing one example of the display control processing in the laptop PC according to the fourth embodiment.

Referring next to FIG. 9, the following describes the operation of the laptop PC 1 according to the present embodiment.

FIG. 9 is a flowchart showing one example of the display control processing in the laptop PC 1 according to the present embodiment.

In FIG. 9, since the processing from Step S401 to Step S403 and at Step S405 is similar to the processing from Step S101 to Step S103 and at Step S105 in FIG. 6 as stated above, their description is omitted.

In the present embodiment, when a part around the notch 141 is designated at Step S403 (Step S403: YES), the display driver 45 progresses the procedure to Step S404.

At Step S404, the display driver 45 moves the display position of the display screen so as to avoid the notch 141. Specifically the display driver 45 moves the display position of the display screen on the display unit 14 by shifting the display position of the display screen as a whole downward so as to avoid the notch 141.

As described above, when the hidden display target is displayed, the display driver 45 of the laptop PC 1 of the present embodiment changes the display position of the display target so as to evade the notch 141. When the display target hidden by the notch 141 is displayed, the display driver 45 moves the display position of the display screen on the display unit 14 so as to evade the notch 141.

Thereby, the laptop PC 1 of the present embodiment can switch the display so as to evade the notch 141 by a simple method.

When the display target hidden by the notch 141 is displayed, the display driver 45 may move the display position of the display target hidden by the notch 141 only so as to avoid the notch 141. Specifically, when the display target hidden by the notch 141 is displayed, the display driver 45 may replace the display position of the hidden display target with a part of the display unit 14 for displaying. In this case, the moving direction is not limited to downward, but may be lateral.

Thereby, the laptop PC 1 of the present embodiment can switch the display so as to evade the notch 141 without affecting the display of the screen as a whole.

The present invention is not limited to the above-described embodiments, and can be modified without deviating from the scope of the present invention.

For instance, the above embodiments describe an example of implemented alone, and these embodiments may be combined for implementation. The laptop PC 1, for example, may switch the display with any one of the triggers according to the first to third embodiments or with a plurality of these triggers.

The non-display trigger is not limited to those described in the above embodiments, and other non-display triggers may be used. For instance, the non-display trigger for the display driver 45 may the timing when predetermined duration has passed after the display driver switches the display so that display target hidden by the notch 141 is displayed so as to avoid the notch 141.

The above embodiments describe the example where the information processing device is the laptop PC 1, and the present invention is not limited to this example. For instance, the information processing device may be other devices, such as a tablet terminal, a smartphone, and a desktop PC.

Figure 5:
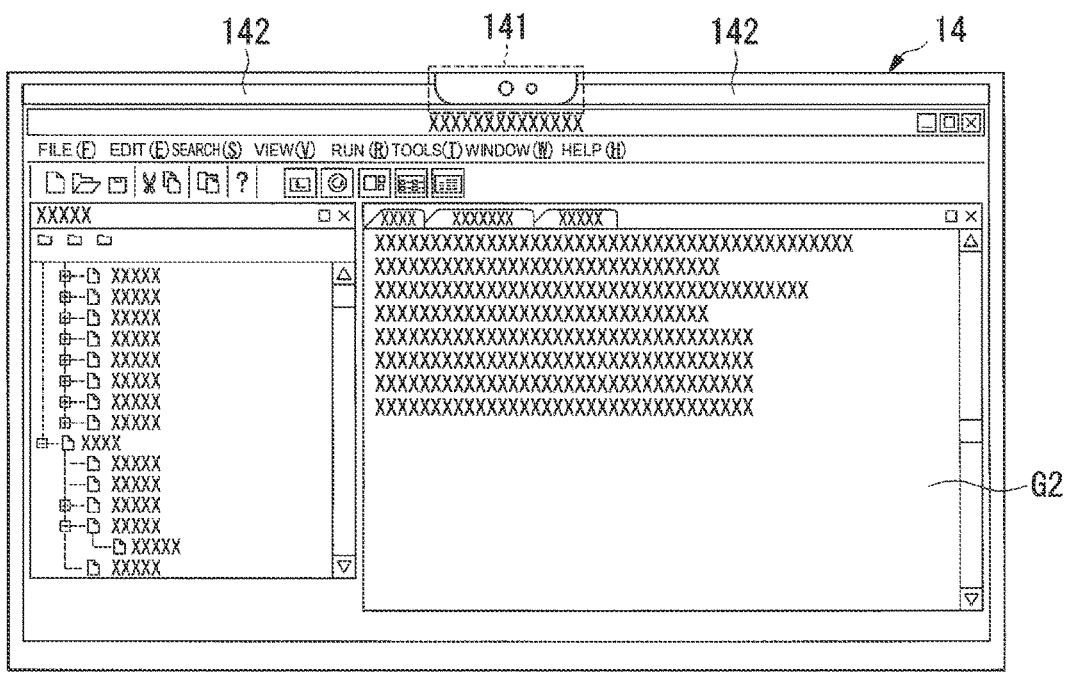
FIG. 5 shows one example of a screen displayed so as to avoid the notch on the display unit according to the first embodiment.

The above embodiments describe the example where, when the display is switched so as to avoid the notch 141, information is not displayed at the non-display area 142 as shown in the screen G2 of FIG. 5. The present invention is not limited to this example. For instance, the display driver 45 may display a button such as a function key or popup information on other software, such as for mail, (message information), at the non-display area 142. This can improve the convenience of the laptop PC 1 more.

The above embodiments describe the example where the display unit 14 has the notch 141 at a center part of the top of the display screen, and the present invention is not limited to this example. For instance, the display unit 14 may have the notch 141 at a position closer to the left or the right of the top, at the bottom, or at the lateral.

The above embodiments describe the example having the imaging unit 27 at the notch 141, and a device other than the imaging unit 27 may be disposed at the notch.

When displaying the display target hidden by the notch 141, the display driver 45 may combine the above embodiments. For instance, when displaying the display target hidden by the notch 141, the display driver 45 may combine a movement of the display position of the display target hidden by the notch 141 and a change in the aspect ratio of the display screen data to display the display target hidden by the notch 141 so as to avoid the notch 141.

The above-stated laptop PC 1 (information processing device) internally includes a computer system. A program to implement the functions of various configurations of the laptop PC 1 as stated above may be stored in a computer-readable recording medium, and the processing at the various configurations of the laptop PC 1 may be performed by causing the computer system to read and execute the program stored in this recording medium. "Causing the computer system to read and execute the program stored in the recording medium" includes installing of such a program in the computer system. The "computer system" here includes an OS and hardware, such as peripherals.

The "computer system" may include a plurality of computer devices connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the laptop PC 1. Alternatively, different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions as stated above may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of semiconductor techniques, an integrated circuit based on such a technique may be used.

The invention claimed is:

1. An information processing device, comprising:
   a display unit having a recess-like notch as a non-displaying part; and
   a display control unit configured to, in response to a display trigger from a user, display a display target hidden by the notch on the display unit so as to avoid the notch, wherein
   the display control unit is further configured to, after the display control unit displays the display target hidden by the notch, when a non-display trigger is detected, the display control unit switches the display of the display target on the display unit so as to be hidden by the notch.

2. The information display device according to claim 1, wherein the display control unit changes an aspect ratio of at least a part of display screen data to be displayed on the display unit to display the hidden display target.

3. The information processing device according to claim 1, wherein, when the hidden display target is displayed, the display control unit replaces a display position of the hidden display target with a part of the display unit for displaying.

4. The information processing device according to claim 3, wherein, when the hidden display target is displayed, the display control unit moves a display position of a display screen to be displayed on the display unit.

5. The information processing device according to claim 1, wherein the display trigger is designation, with a pointing device, within a predetermined range including the notch.

6. The information processing device according to claim 1, wherein the display trigger is reception of a predetermined key input operation with a key input unit.

7. The information processing device according to claim 1, wherein the display trigger is reception of detection of gaze of the user, in a predetermined range including the notch, with an eye-gaze tracking unit to detect gaze of the user.

8. A method for controlling display of an information processing device including a display unit having a recess-like notch as a non-displaying part, comprising:
   a trigger reception step of receiving a trigger from a user; and
   a display control step of, in response to the trigger from the user at the trigger reception step, displaying a display target hidden by the notch on the display unit so as to avoid the notch, wherein
   after display target is displayed, when a non-display trigger is detected, the display control unit switches the display of the display target on the display unit so as to be hidden by the notch.

9. The information display device according to claim 1, wherein
   when a display target is displayed, the display control unit makes a non-display area which is next to the notch and has a width equal to the notch.

10. An information processing device, comprising:
    a display unit having a recess-like notch as a non-displaying part; and
    a display control unit configured to, in response to a display trigger from a user, display a display target hidden by the notch on the display unit so as to avoid the notch, wherein
    when a display target is displayed, the display control unit makes a non-display area which is next to the notch and has a width equal to the notch.

* * * * *